(12) United States Patent
Loehden et al.

(10) Patent No.: US 8,084,136 B2
(45) Date of Patent: Dec. 27, 2011

(54) HEAT-SEALING MATERIAL FOR ALUMINUM FOILS AND POLYETHYLENE TEREPHTHALATE FOILS AGAINST POLYPROPYL, POLYVINYL CHLORIDE, AND POLYSTYROL CONTAINERS

(75) Inventors: Gerd Loehden, Essen (DE); Sven Balk, Hanau (DE); Marita Kaufmann, Griesheim (DE); Axel Schroeder, Reinheim (DE); Thorsten Brand, Marl (DE); Gabriele Brenner, Duelmen (DE)

(73) Assignee: Evonik Röhm GmbH, Darmstadt (DE)

( * ) Notice: Subject to any disclaimer, the term of this patent is extended or adjusted under 35 U.S.C. 154(b) by 818 days.

(21) Appl. No.: 12/159,221

(22) PCT Filed: Dec. 19, 2006

(86) PCT No.: PCT/EP2006/069871
§ 371 (c)(1),
(2), (4) Date: Jun. 26, 2008

(87) PCT Pub. No.: WO2007/098816
PCT Pub. Date: Sep. 7, 2007

(65) Prior Publication Data
US 2008/0292893 A1 Nov. 27, 2008

(30) Foreign Application Priority Data
Feb. 28, 2006 (DE) .......... 10 2006 009 586

(51) Int. Cl.
*B32B 27/00* (2006.01)
*B32B 7/04* (2006.01)
*B32B 15/18* (2006.01)
*C08L 51/08* (2006.01)

(52) U.S. Cl. .......... 428/458; 428/200; 428/480; 525/63; 525/222

(58) Field of Classification Search .......... 428/458, 428/200, 480; 525/63, 222
See application file for complete search history.

(56) References Cited

U.S. PATENT DOCUMENTS

| | | | |
|---|---|---|---|
| 4,133,909 A | 1/1979 | Spencer | |
| 5,794,403 A | 8/1998 | Oberlander et al. | |
| 6,498,209 B1 | 12/2002 | Loehden et al. | |
| 6,566,441 B1 | 5/2003 | Lohden et al. | |
| 6,809,163 B2 | 10/2004 | Schultes et al. | |
| 6,989,409 B2 | 1/2006 | Loehden et al. | |
| 2003/0113462 A1 | 6/2003 | Hirose et al. | |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0196655 A1 | 8/2007 | Schattka et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2008/0057205 A1 | 3/2008 | Lohden et al. | |
| 2008/0237529 A1 | 10/2008 | Schattka et al. | |
| 2008/0262176 A1 | 10/2008 | Loehden et al. | |
| 2008/0292893 A1 | 11/2008 | Loehden et al. | |
| 2008/0293854 A1 | 11/2008 | Schattka et al. | |
| 2009/0048401 A1 | 2/2009 | Loehden et al. | |
| 2009/0062508 A1 | 3/2009 | Balk et al. | |

FOREIGN PATENT DOCUMENTS

| | | |
|---|---|---|
| CN | 1430657 A | 7/2003 |
| DE | 10 2004 054446 | 5/2006 |
| EP | 0 378 954 | 7/1990 |
| WO | 92 01734 | 2/1992 |
| WO | 01/90265 | 11/2001 |
| WO | 03/010256 | 2/2003 |

OTHER PUBLICATIONS

U.S. Appl. No. 12/992,184, filed Nov. 11, 2010, Koschabek, et al.
U.S. Appl. No. 12/441,664, filed Mar. 17, 2009, Schattka, et al.
U.S. Appl. No. 12/290,880, filed Nov. 4, 2008, Einfeldt, et al.
U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/373,892, filed Jan. 15, 2009, Balk, et al.
U.S. Appl. No. 12/373,531, filed Jan. 13, 2009, Schattka, et al.
U.S. Appl. No. 12/440,244, filed Mar. 6, 2009, Balk, et al.
U.S. Appl. No. 12/279,197, filed Oct. 21, 2008, Roos, et al.
U.S. Appl. No. 12/673,348, filed Feb. 12, 2010, Brenner, et al.

*Primary Examiner* — Timothy J. Kugel
(74) *Attorney, Agent, or Firm* — Oblon, Spivak, McClelland, Maier & Neustadt, L.L.P.

(57) ABSTRACT

The invention relates to a heat-sealable coating system suitable for the sealing of various types of substrate and comprising a film-forming dispersion, characterized in that a polymer type A is present and is a polyester or a polyester mixture, a polymer type B is present and is a (meth)acrylate homo- or/and copolymer, containing standard methacrylates and/or standard acrylates, and a polymer type AB is present and is a graft copolymer composed of polymer type A and polymer type B, and if appropriate a polymer type C is present and is an olefin polymer or is an olefin copolymer, and a polymer type CB is present and is a graft polymer composed of polymer type C and polymer type B, and also if appropriate a polymer type D and/or a polymer type DA is present.

23 Claims, No Drawings

HEAT-SEALING MATERIAL FOR ALUMINUM FOILS AND POLYETHYLENE TEREPHTHALATE FOILS AGAINST POLYPROPYL, POLYVINYL CHLORIDE, AND POLYSTYROL CONTAINERS

FIELD OF THE INVENTION

The sector for food-and-drink packaging and tablet packaging has for some time now used not only polystyrene (PS) and polyvinyl chloride (PVC) but also polypropylene (PP) and polyethylene terephthalate (PET). Polypropylene with no pretreatment is a very critical plastic for the coatings sector, because adhesion problems very often occur. Although these problems take on a somewhat different aspect in the case of heat sealing to polypropylene (PP not being coated here but adhered), they are nevertheless likewise present. For example, the poly(meth)acrylate resins which have proven successful in the sealing of polystyrene or of PVC, e.g. DEGALAN® P 24 or DEGALAN® N 80, cannot be used because they cannot achieve the seal seam strength.

DEGALAN® P 24 is a copolymer composed of methyl methacrylate and butyl methacrylate and is marketed by Röhm GmbH & Co. KG. DEGALAN® N80 is a methyl acrylate-ethyl methacrylate copolymer and is likewise marketed by Röhm GmbH & Co. KG.

DEGALAN® PM 555 (producer: Röhm GmbH & Co. KG), which is a specific solvent-containing binder system based on polyolefin/poly(meth)acrylate in butyl acetate/methyl ethyl ketone, has permitted development of a binder which has an excellent suitability for the sealing of aluminium foils with respect to polypropylene. However, furthermore, DEGALAN® PM 555 also permits similarly good sealing with respect to polystyrene and PVC. DEGALAN® PM 555 requires priming to achieve adhesion of aluminium to PVC copolymers, e.g. VINYLITE® VMCH, but can also be used as a single-layer system in an appropriate combination. VINYLITE® VMCH is an acid-containing PVC polymer (marketed by: Union Carbide).

Finally, DEGALAN® 4150-E (producer: Röhm GmbH & Co. KG) has been developed in order to improve the known heat-sealing composition for aluminium foils and for plastics foils in such a way as to permit use of a solvent system not listed in the HAPS list (hazardous air pollutants), instead of the solvent-containing binder system conventional hitherto and composed of butyl acetate and methyl ethyl ketone.

PRIOR ART

Plastics products are nowadays widely used to replace vessels and containers composed of wood or of inorganic materials, such as metal, glass, ceramics in food-and-drink packaging. In all cases, the requirements are particularly stringent if the vessels or containers are used for the storage or preservation of food or drinks. A decisive aspect of the preservation of food or drinks, whether via dehydration, freezing, or sterilization, is the complete prevention of microbial growth. This frequently means that the containers have to be sealed so as to be gastight. Other facts which have to be taken into account with plastics containers are mechanical stability, control of water content, and also the action of the atmosphere and of light. (Cf. Ullmann's Encyclopedia of Industrial Chemistry 25$^{th}$ Ed. Vol. All, 523-560; 583-618 VCH 1988; this reference also deals with the applicable standards).

Food-and-drink technology makes wide use of an aluminium lid coated with a sealable coating for the closure of plastics vessels, especially for dairy products, such as yoghurt pots.

Many of these aluminium lids are a three-layer laminate, the outer layer of which is often composed of (biaxially oriented) polyethylene terephthalate (OPET), of biaxially oriented polypropylene (OPP), or of polyamide (OPA), or of cellulose. In contrast, the heat-sealable inner layer is usually composed of polyethylene, of ethylene copolymers, or of polypropylene (U.S. Pat. No. 4,753,708; G. Stehle, Neue Verpackung 9/91, pp. 94-101). However, there is increasing discussion of economic and environmental reasons for avoiding the use of aluminium, e.g. for food-and-drink packaging, in particular the high cost of energy for aluminium production.

Use is therefore also made of plastics foils instead of aluminium, these having a sealable coating. This sealable coating is adapted to the plastic used. A very considerable part is played by rigid PVC, which is a relatively low-cost material for sealable foils with good mechanical strength and good barrier properties, the sealable coating layer used here usually being an acrylic resin whose adhesion and melting point can be modified advantageously via additives. PET foils are of increasing importance. PET foils are usually sealed by means of polyvinyl acetate or polyethylene/polyvinyl acetate or by means of polyester coatings. However, these systems have been developed specifically for the sealing of PET backing materials, and they have only limited suitability for the sealing of aluminium foils or of aluminium coatings on composite foils. There is no heat-sealing binder known hitherto which has a suitable formulation giving suitability not only for the sealing of aluminium foils but also for the sealing of PET foils or of PET-foil coatings.

DE-A 35 31 036 describes coextrudable plastics foils which are composed of a sealable layer of impact-modified polystyrene, and of a block copolymer, and of a lubricant.

However, EP-A 0 406 681 rightly points out the problems with use of heat-sealable plastics foils instead of aluminium foil. A restriction generally discernable is the substantially reduced processing latitude. The resultant processing range is mostly very narrow, from 10° C. to 20° C., fairly constant compliance with this range being necessary to ensure problem-free production and satisfactory use of the sealed pack. Filling systems with a number of cavities for the simultaneous filling of cups do not always comply with this precondition. EP-A 0 406 681 had the object of improving the polystyrene-based foils which could be produced by the coextrusion process as claimed in DE-A 35 31 036 inter alia in such a way as to increase processing latitude and processing reliability. A further intention was to ensure satisfactory production, even on filling systems with a number of filling cavities. In practice this means the use of relatively high seal temperatures, with corresponding requirements placed upon the quality of the plastics foils.

According to EP-A 0 406 681, these requirements were fulfilled by a sealable plastics foil produced by the coextrusion process or by lamination and composed of two layers A and C and, where appropriate, of a layer B, and also, where appropriate, in each case a layer of an adhesion promoter D for the bonding of each pair of the layers A, and where appropriate B and C, and composed of from 1 to 50% of a layer of a heat-sealable, impact-modified polystyrene A, up to 95% of a backing layer B, and from 1 to 99% of a high-melting plastics layer C, the total of the thicknesses or of the weight of A and, where appropriate, B and C always being 100.

DE 101 50 898 (Röhm) relates to a heat-sealing system composed of an olefin polymer or olefin copolymer A, of a methacrylate copolymer B and of a graft polymer AX composed of the above components and also of a solvent or solvent mixture. A feature of the heat-sealing system is high heat resistance and short sealing times.

The expression (meth)acrylate here means not only methacrylate, e.g. methyl methacrylate, ethyl methacrylate, etc., but also acrylate, e.g. methyl acrylate, ethyl acrylate etc., and also mixtures composed of the two.

OBJECT

It was an object of the present invention to provide, via development and formulation of suitable polymers, heat-sealing coatings which are suitable for sealing PET foils or PET-coated foils with respect to a variety of pot materials.

A first object was to develop a binder suitable for sealing PET foils or PET-coated foils with respect to pot materials such as polystyrene, polyester, or polyvinyl chloride. The polyesters listed can, for example, be amorphous polyethylene terephthalate (APET).

Another object was to achieve sufficiently high strengths of the closure with conventional cycle times used in the heat sealing of plastics foils.

A second object was to develop a hot-sealing-coating binder which is suitable for closure of not only aluminium foils but also PET foils and not only aluminium-coated but also PET-coated foils with respect to all of the pot materials used, such as polystyrene, polypropylene, polyester or polyvinyl chloride. The seal should moreover, when assessed against the two foil materials, have at least comparable if not better seal and barrier properties than the already established heat-sealing systems (e.g. Degalan® PM 555) when assessed against aluminium foils. This binder is moreover to have at least equivalent sealing performance when assessed against established systems with respect to aluminium foils.

Another object was to achieve high adhesion even at relatively high temperatures directly after the sealing process (high heat resistance), since this can achieve short cycle times for the sealing of the foil and for food-and-drink packages.

ACHIEVEMENT OF OBJECT

The objects are achieved via a heat-sealable coating system suitable for the sealing of various types of substrate and comprising a film-forming dispersion, characterized in that
a polymer type A is present and is a polyester or a polyester mixture,
a polymer type B is present and is a (meth)acrylate homo- or/and copolymer, containing standard methacrylates and/or standard acrylates, and
a polymer type AB is present and is a graft copolymer composed of polymer type A and polymer type B, and the amount of polymer type A is from 5% by weight to 60% by weight,
the amount of polymer type B is from 5% by weight to 70% by weight,
the amount of polymer type AB is from 5% by weight to 60% by weight,
based on the total weight of the polymer types A, B and AB, and that the ratio by weight of the entirety of the polymer types A, B and AB to the weight of the solvent or of the solvent mixture L is from 5:1 to 1:5.

It has been found that this heat-sealable coating system suitable for the sealing of various types of substrate gives very good heat sealing of polyester foils or of PET-coated foils with respect to polystyrene, polyvinyl chloride and polyester.

Surprisingly, if the polymer type C, which is an olefin polymer or an olefin copolymer, and/or a polymer type CB, which is a graft polymer composed of polymer type C and polymer type B, are added to this system, it is possible to heat seal polyester foils and aluminium foils or not only aluminium- but also PET-coated foils with respect to polystyrene, polyester and polyvinyl chloride, and also with respect to polypropylene and polyethylene.

Preference is given to a polymer type A, which is a polyester whose preparation involved copolymerization of itaconic acid.

Surprisingly, it has been found that a coating system comprising a film-forming dispersion, characterized in that
the polymer type A is a polyester whose preparation involved copolymerization of itaconic acid,
the polymer type B is a (meth)acrylate homo- or/and copolymer, containing standard methacrylates and/or standard acrylates, and
the polymer type AB is a graft copolymer composed of polymer type A and polymer type B, and the amount of polymer type A is from 5% by weight to 60% by weight,
the amount of polymer type B is from 5% by weight to 70% by weight,
the amount of polymer type AB is from 5% by weight to 60% by weight,
based on the total weight of polymer types A, B and AB, and that the ratio by weight of the entirety of the polymer types A, B and AB to the weight of the solvent or of the solvent mixture L is from 5:1 to 1:5 is an excellent heat-sealable system suitable for the sealing of various types of substrate which heat seals not only polyester foil but also aluminium foil, or not only aluminium-coated foils but also PET-coated foils with respect to polystyrene, polyester and polyvinyl chloride.

It has been found that coating systems which
comprise a polymer type A, which is a polyester whose preparation involved copolymerization of itaconic acid,
comprise a polymer type B which is a (meth)acrylate homo- or/and copolymer, containing standard methacrylates and/or standard acrylates,
comprise a polymer type AB, which is a graft copolymer composed of polymer type A and polymer type B,
comprise a polymer type C, which is an olefin polymer or an olefin copolymer, and
comprise a polymer type CB, which is a graft polymer composed of polymer type C and polymer type B, and also, if appropriate,
comprise a polymer type D which is a polyvinyl chloride and/or
comprise a polymer type $D_A$, which is a polyamide,
give excellent heat sealing of not only polyester foil but also of aluminium foil, or not only of aluminium-coated foils but also of PET-coated foils, with respect to polystyrene, polyester and polyvinyl chloride, but also with respect to polypropylene and polyethylene.

The amount of polymer type A here can be from 5% by weight to 60% by weight,
the amount of polymer type B can be from 5% by weight to 70% by weight,
the amount of polymer type C can be from 5% by weight to 60% by weight,
the amount of polymer type AB can be from 5% by weight to 60% by weight,
the amount of polymer type CB can be from 5% by weight to 60% by weight, the amount of polymer type D can be from 0% by weight to 10% by weight, the amount of polymer type $D_A$ can be from 0% by weight to 10% by weight, based on the total weight of the polymer types A, B, AB, C, CB, D and $D_A$ and the ratio by weight of the entirety of the polymer types A, B, AB, C, CB, D and $D_A$ to the weight of the solvent or of the solvent mixture L is from 5:1 to 1:5.

It has been found that sufficiently high strengths of the closure are achieved with the conventional cycle times used in the heat sealing of plastics foils.

When assessed against the two foil materials, the sealing process exhibits seal and barrier properties comparable with those of the hitherto established heat-sealing systems (e.g. DEGALAN® PM 555) when assessed against aluminium foils.

High adhesion has been achieved (high heat resistance) even at relatively high temperatures directly after the sealing process. This can achieve short cycle times in the sealing process.

Polymer Type A

According to the invention, copolyesters which feature itaconic acid as monomer unit are used as polymer type A. The copolyesters for the purposes of the invention have a linear or branched structure and are characterized via OH numbers of from 5 to 150 mg KOH/g, preferably from 10 to 50 mg KOH/g acid numbers below 10 mg KOH/g, preferably below 5 mg KOH/g and particularly preferably below 2 mg KOH/g a number-average molar mass of from 700 to 25 000 g/mol, preferably from 2000 to 12 000 g/mol.

The content of itaconic acid in the inventive polyesters is in the range from 0.1 mol % to 20 mol %, preferably from 1 mol % to 10 mol % and very particularly preferably from 2 mol % to 8 mol %, based on the total amount of polycarboxylic acids used. In other respects, the nature of the polycarboxylic acids used for the inventive copolyesters is per se as desired. For example, aliphatic and/or cycloaliphatic and/or aromatic polycarboxylic acids can be present. Polycarboxylic acids are compounds which preferably bear more than one and particularly preferably two carboxy groups; unlike in the general definition, monocarboxylic acids are also among particular embodiments of these.

Examples of aliphatic polycarboxylic acids having relatively short chains are succinic acid, glutaric acid, adipic acid, azelaic acid, sebacic acid, dodecanedioic acid, tetradecanedioic acid, octadecanedioic acid. Examples of cycloaliphatic polycarboxylic acids are the isomers of cyclohexanedicarboxylic acid. Examples of aromatic polycarboxylic acids are the isomers of benzenedicarboxylic acid and trimellitic acid. If appropriate, in place of the free polycarboxylic acids it is also possible to use their esterifiable derivatives, e.g. appropriate lower-alkyl esters or cyclic anhydrides.

The nature of the polyols used for the inventive hydroxypolyesters is per se as desired. For example, aliphatic and/or cycloaliphatic and/or aromatic polyols can be present. Polyols are compounds which preferably bear more than one and particularly preferably two hydroxy groups; unlike in the general definition, monohydroxy compounds are also among particular embodiments of these.

Examples of polyols are ethylene glycol, 1,2-propanediol, 1,3-propanediol, 1,4-butanediol, 1,5-pentanediol, 1,6-hexanediol, 1,9-nonanediol, 1,12-dodecanediol, neopentyl glycol, butylethyl-1,3-propanediol, methyl-1,3-propanediol, methylpentanediols, cyclohexanedimethanols, trimethylolpropane, pentaerythritol and mixtures thereof.

Among aromatic polyols are reaction products of aromatic polyhydroxy compounds, e.g. hydroquinone, bisphenol A, bisphenol F, dihydroxynaphthalene, etc. with epoxides, e.g. ethylene oxide or propylene oxide.

Other polyols that can be present are ether diols, i.e. oligomers and, respectively, polymers such as those based on ethylene glycol, propylene glycol or 1,4-butanediol. Linear aliphatic glycols are particularly preferred.

Alongside polyols and dicarboxylic acids, lactones can also be used for the synthesis of the hydroxypolyesters.

The inventive copolyesters having itaconic acid contents of from 0.1 mol % to 20 mol %, preferably from 1 mol % to 10 mol % and very particularly preferably from 2 mol % to 8 mol %, based on the total amount of polycarboxylic acids used, are prepared by means of established techniques for (poly)condensation reactions.

It is also possible to polymerize monomers which lead to component B in the simultaneous presence of a polymer of type A and of an initiator.

The amounts used of polymer type A prior to the graft reaction in the inventive mixture are from 10% by weight to 90% by weight, preferably from 25% by weight to 75% by weight and very particularly preferably from 40% by weight to 60% by weight.

The amounts of polymer type A present in the inventive mixture after the reaction are from 5% by weight to 60% by weight, preferably from 5% by weight to 50% by weight and very particularly preferably from 5% by weight to 40% by weight.

Polymer Type B

The polymer type B can be produced as a by-product in the synthesis of the graft copolymer AB. The constitution of the B chains in the product constituent AB likewise corresponds to the description below:

polymer type or chain segment B is defined as composed of polyacrylate sequences and/or of polymethacrylate sequences. These are in themselves, e.g. in the form of a corresponding homo- or copolymer, soluble in the solvent system L. The polymer B is generally composed of more than 50% by weight, preferably from 80% by weight to 100% by weight of monomers of the formula I

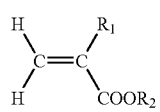

I where $R_1$ is hydrogen or methyl and $R_2$ is an alkyl radical, or an aliphatic or aromatic radical having from 1 to 30 carbon atoms, preferably from 1 to 20 carbon atoms.

Polymer B may also contain:

Monomers of the formula II

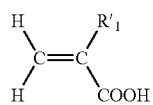

II where $R'_1$ is hydrogen or methyl, or/and may contain polymerizable anhydrides and/or monomers of the formula III

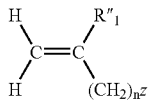

where $R''_1$ is hydrogen or methyl and Z is an unsubstituted or alkyl-substituted phenyl radical, a —$COR_3$ radical, a

an —$OR_4$ radical or a chlorine atom, and where $R_3$ and $R_4$ are an unbranched or branched alkyl radical having from 1 to 20 carbon atoms or a phenyl radical, and n is 0 or 1, and/or monomers of the formula IV

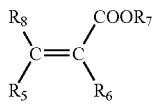

where $R_5$ and $R_6$ are hydrogen or a —$COOR'_7$ radical, $R_6$, hydrogen, or a —$CH_2COOR''_7$ radical, with the proviso that the compound of the formula IV has to contain two carboxy-containing groups, and where $R_7$, $R'_7$ and $R''_7$ are hydrogen or an unbranched or branched alkyl radical having from 1 to 20 carbon atoms or phenyl. Polymer B may, where appropriate, also contain fractions of the monomers of the formula V

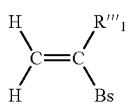

where $R'''_1$ is as defined for $R_1$ and Bs is a nitrogen-containing functional radical, such as a —CN group, or a —$CONR_9R_{10}$ group, where $R_9$ and $R_{10}$, independently of one another, are hydrogen or an alkyl radical having from 1 to 20 carbon atoms, or where $R_9$ and $R_{10}$ together with the nitrogen form a heterocyclic 5-membered or 6-membered ring, or where Bs is an (inert) heterocyclic radical, in particular a pyridine, pyrrolidine, imidazole, carbazole, or lactam radical or alkylated derivatives of the same, or Bs is —$CH_2OH$, or where Bs is

where Q is an unsubstituted or alkyl-substituted alkylene radical having from 2 to 8 carbon atoms and $R_{11}$ is —OH, —$OR'''_7$, or an —$NR'_9R'_{10}$ radical, where $R'''_7$, $R'_9$ and $R'_{10}$ are defined as for $R_7$, $R_8$ and $R_9$, e.g. together with the nitrogen atom, where appropriate together with another heteroatom, form a 5- to 6-membered heterocyclic ring.

Methyl methacrylate, ethyl methacrylate, propyl methacrylate, butyl methacrylate, and isobutyl methacrylate are mentioned by way of examples for the monomers of the formula I. The monomers of the formula I are also termed standard methacrylates.

Acrylic acid or methacrylic acid are mentioned by way of examples of the monomers of the formula II.

Styrene, α-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate and dibutyl itaconate are mentioned by way of particular examples of monomers of the formulae III and IV. The proportion of the monomers of the formula II-V in the polymer B is generally from 0% by weight to 50% by weight, preferably from 0% by weight to 20% by weight (based on the monomers of the polymer B). The proportion of the monomers of the formulae II and/or V in the polymer B will not generally exceed 20% by weight, and is generally from 0% by weight to 10% by weight, preferably from 0% by weight to 5% by weight.

The detailed content and constitution of the polymer B will advantageously be selected with a view to the desired technical function.

The amounts of monomer used in the inventive mixture after the polymerization process forming polymer type B are from 10% by weight to 90% by weight, preferably from 25% by weight to 75% by weight and very particularly preferably from 40% by weight to 60% by weight.

The amounts of polymer type B present in the inventive mixture after the reaction are from 5% by weight to 70% by weight, preferably from 5% by weight to 60% by weight and very particularly preferably from 5% by weight to 40% by weight.

Polymer Type C

The olefin polymers and olefin copolymers to be used as C according to the invention are known per se. These are primarily the polymers previously recommended as heat-sealable compositions, composed of ethylene, propylene, butylene and/or other α-olefins having from 5 to 20 carbon atoms. The molecular weight is generally from 10 000 to 300 000, preferably from 50 000 to 150 000. Olefin copolymers of the type to be used are described by way of example in the German laid-open specifications DE-A 16 44 941, DE-A 17 69 834, DE-A 1939 037, DE-A 19 63 039 and DE-A 20 59 981.

An example of an olefin polymer which may be used is Buna® 6170 (producer: Lanxess AG).

Ethylene-propylene copolymers are particularly useful; terpolymers are also possible with addition of the known ter-components, such as ethylidenenorbornene (cf. Macromolecular Reviews, Vol. 10 1975), but their tendency toward crosslinking during the ageing process has to be included in calculations. The distribution here may be substantially random, but it is also possible and advantageous to use sequence polymers having ethylene blocks. The ratio of the ethylene/propylene monomers here is variable within certain limits, which can be set with about 95% for ethylene and about 95% for propylene as upper limit.

The amounts of polymer type C used in the inventive mixture are from 5% by weight to 60% by weight, preferably from 20% by weight to 55% by weight and very particularly preferably from 25% by weight to 55% by weight.

Polymer Type AB

Preparation of Graft Polymers AB

The inventive process for preparation of a graft copolymer AB features use of reaction of a suitable initiator further described below with double bonds of itaconic acid repeat units in the polymer of type A to form reactive (free-radical) centres for free-radical polymerization of (meth)acrylates.

Reactive centres are polymer chains which have one or more initiator units for a free-radical polymerization reaction. These initiator units can be formed simultaneously or else at different times. It is therefore also certainly possible that itaconic acid units are not activated until further free radicals formed on further itaconic acids have been deactivated via termination reactions.

A general method of preparing the graft polymer AB grafts monomers of type I-V, which lead to component B, on component A under reaction conditions suitable for this purpose. The polymer type AB is a graft copolymer having a polyester main chain and having a poly(meth)acrylate side chain.

To this end, a 10% by weight-50% by weight, preferably 20% by weight-30% by weight, solution of an itaconic-acid-containing polyester is prepared in a suitable solvent which is inert under polymerization conditions and whose boiling point is normally above the process temperature. Examples of solvents that can be used are acetates, such as ethyl, propyl or butyl acetate, aliphatic solvents, such as isooctane, cycloaliphatic solvents, such as cyclohexane, and carbonylic solvents, such as butanone.

The proportion of the solvent or of the solvent mixture in the polymer dispersions concentrated according to the invention can, for example, be 80% by weight, or in a particularly advantageous case as little as 20% by weight, preferably below 70% by weight, in practice mostly from 60% by weight to 40% by weight.

The monomers of the formula I and, respectively, possibly the other monomers II-V are added in the stated ratios to the polyester solutions, and polymerization is carried out with addition of one or more, preferably peroxidic, free-radical initiators at temperatures of from −10° C. to 100° C. within a period which is usually from 4-8 hours. Maximum conversion is desirable. Azo compounds, such as AIBN, or peresters, such as tert-butyl peroctoate are preferably used as free-radical initiator. The initiator concentration depends on the number of desired graft sites and on the desired molecular weight of the segment B. The initiator concentration is generally from 0.1% by weight to 3% by weight, based on the polymer.

If appropriate, in order to set the desired molecular weight of the segments B, regulators can also be used concomitantly. Examples of suitable regulators are sulphur regulators, in particular regulators containing mercapto groups, e.g. dodecyl mercaptan. The concentrations of regulators are generally from 0.1% by weight to 1.0% by weight, based on the entire polymer.

Alongside the method described of solution polymerization a bulk method can also be used for the synthesis of the graft copolymers of the type AB. To this end, the polyesters are dissolved in the (meth)acrylic monomer mixture prior to initiation of the free-radical polymerization reaction.

As an alternative, free-radical initiator can also be used as initial charge in a melt of the polyester and then the monomer mixture can be admixed with this material.

The amounts of polymer type AB present in the inventive mixture after the graft reaction are from 5% by weight to 60% by weight, preferably from 20% by weight to 55% by weight and very particularly preferably from 30% by weight to 50% by weight.

Polymer Type CB
Preparation of Graft Polymers CB

In general the graft polymer CB is prepared by using a suitable emulsifier to prepare a dispersion from component C, and grafting, onto this, monomers of type I-V which lead to component B, under the reaction conditions suitable for this purpose. The structure of the emulsifier may be similar to that of the CB system. The processes for preparing suitable emulsifiers of CB type are known per se. The transfer-grafting method may be used, for example. (Cf. also Houben-Weyl, Methoden der Org. Chemie [Methods of Organic Chemistry], Vol. 1411, p. 114, H. A. J. Battaerd, G. W. Tregear, Polymer Reviews, Vol. 16, Interscience (1967)).

For this, a 10% by weight-50% by weight, preferably 20% by weight-30% by weight, solution of an olefin copolymer (OCP) is prepared in a suitable solvent which is inert under polymerization conditions and whose boiling point is normally above the process temperature. Examples of solvents which may be used are butyl acetate or aliphatic, cycloaliphatic, or aromatic hydrocarbons. The monomers of the formula I and possibly the other monomers II-V are added in the stated ratios to these OCP solutions, and the mixture is polymerized with addition of one or more, preferably peroxidic, free-radical initiators at temperatures of 60° C.-50° C., within a period which is usually from 4 to 8 hours. Maximum conversion is desirable. It is preferable to use peresters, such as tert-butyl peroctoate. The initiator concentration depends on the desired number of graft sites and on the desired molecular weight of the segment B. The initiator concentration is generally from 0.2% by weight to 3% by weight, based on the polymer.

In order to set the desired molecular weight of the segments B, regulators can optionally be used concomitantly. Examples of suitable regulators are sulphur regulators, in particular regulators containing mercapto groups, e.g. dodecyl mercaptan. The concentrations of regulators are generally from 0.1% by weight to 1.0% by weight, based on the entire polymer. Another method of preparing the graft polymers CB is hydroperoxidization of an OCP as first step. The hydroperoxide groups thus formed and situated on the chain can initiate the graft polymerization of the vinyl monomers in a subsequent stage. (Cf. H. A. J. Battaerd, G. W. Tregear, Polymer Reviews loc. cit.).

The amounts used of polymer type CB in the inventive mixture are from 5% by weight to 60% by weight, preferably from 20% by weight to 55% by weight and very particularly preferably from 25% by weight to 50% by weight.

In one particular embodiment, polymer type B can be grafted simultaneously onto polymer type A and polymer type C in order to prepare the graft copolymers AB and CB.

The polymer types AB and CB can also be blended, the simultaneous synthesis being preferred here, since the result is a stabler dispersion. When assessment is made against a simple blend, the problem of phase separation can be mitigated.

Polymer Type D or $D_A$

In order to improve aluminium adhesion, formulation with polymer type D is an option: priming of the foil or addition of from 0.1% by weight to 10% by weight, or preferably of from 0.1% by weight to 5% by weight, of polyvinyl chloride to the coating formulation can give an improvement in Al adhesion. An example of a material used is VINYLITE® VMCH (marketed by Union Carbide).

Polymer type $D_A$ can optionally be added to reduce the level of any possible abrasion during processing. By way of example, a polyamide of VESTOSIND 2159 (Degussa AG) type can be used. The proportion of this added can be from 0.1% by weight to 10% by weight in a formulation, preferably from 0.1% by weight to 5% by weight.

Preliminary experiments have shown that when a binder system as described above is used, composed of components A, B, AB and optionally D and, respectively, $D_A$ in a solvent system composed of n-butyl acetate and ethyl methyl ketone (e.g. analogously to DEGALAN® PM 555) in a formulation with polymer component C, irrespective of the concentration thereof, the PET adhesion present is only unsatisfactory. In contrast, when the solvent system is changed to an inventive constitution described below, the result is very good heat-sealing properties in a suitable formulation with polymer component C.

The Solvent or Solvent System L

The inventive heat-sealing system comprises not only the polymer types A, B and C, the graft polymers AB and CB and optionally the polymer type D or $D_A$ but also a solvent system L.

The solvents to be used for the solvent system L are to be selected so that they meet the requirements of coating technology for plastics and metals. The solvents to be used—optionally in a mixture—are to be inert and in their entirety non-hazardous, the boiling point at 760 torr being if at all possible 105° C. or below.

A solvent that can be used is a mixture composed of esters of aliphatic carboxylic acids with aliphatic alcohols and ketones and with aliphatic hydrocarbons.

An aliphatic carboxylic acid that can be used is acetic acid, propynoic acid or butyric acid.

Aliphatic alcohols that can be used are ethanol, propanol, isopropanol, n-butanol, 2-butanol, 2-methyl-1-propanol or 2-methyl-2-propanol.

Examples of ketones that can be used are acetone or ethyl methyl ketone.

Aliphatic hydrocarbons that can be used are pentane, hexane, heptane, octane, isooctane, nonane, decane, undecane or dodecane.

The aliphatic hydrocarbons can also be present in the form of their isomer mixtures and in mixtures with one another. It is also possible to use cycloalkanes and substituted cycloalkanes.

It is also possible to use mixtures of the solvents described above for the carrier system. The proportion of the solvent or of the solvent system L in the inventively concentrated polymer dispersions can, for example, be 80% by weight, particularly advantageously as little as 20% by weight, preferably below 70% by weight, in practice mostly from 55% by weight to 40% by weight.

The auxiliaries and additives conventional for the heat-sealing process can moreover be added to the heat-sealable coating system suitable for the sealing of various types of substrate.

Preparation of Heat-sealing System

Synthesis with the Polymer Types A-D

Alternative A:

As explained above, a dispersion or, given suitable matching of polymer compatibility, a homogeneous solution of components A and C is prepared in the solvent system L with the aid of a suitable emulsifier and, under suitable reaction conditions, monomers of type I-V which lead to component B are grafted simultaneously onto components A and C. The ratios by weight of the proportions of A and B are generally from 1:5 to 5:1. The ratio by weight of A to C is generally from 1:2 to 10:1, preferably from 1:1 to 5:1.

The content of the entire polymer, based on the entire dispersion, is at least 10% by weight, and a desirable content in practice here is from 40% by weight to 80% by weight, normally from 45% by weight to 60% by weight.

The inventive process gives heat-sealable coating compositions in dispersion which have adequate stability for the processing technique. The stability of the dispersions amounts to at least a plurality of days, normally a plurality of weeks to months.

The result is a large number of application sectors for the inventive coating systems. Those which should be highlighted are the uses of coating systems according to Claim 1, which can provide heat sealing of polyester foils or of PET-coated foils with respect to polystyrene, polyester and polyvinyl chloride. Coating systems according to Claims 4 and 13 are used in the heat sealing of polyester foil or else aluminium foil or not only aluminium—but also PET-coated foils with respect to polystyrene, polyester and polyvinyl chloride. The coating systems according to Claims 2, 11 and 15 are used in the heat sealing of polyester foil and also aluminium foil or of not only aluminium—but also PET-coated foils with respect to polystyrene, polyester and polyvinyl chloride, and also with respect to polypropylene and polyethylene.

The examples given below are given for better illustration of the present invention but are not intended to restrict the invention to the features disclosed herein.

EXAMPLES

Foil Material Used

Flexible aluminium foil of thickness 40 μm

Polypropylene foil extruded from JE 6100 pellets (Shell) thickness 0.2 mm

Polyester foil: Hostaphan WDW 50

Laboratory Application of Heat-sealing Solution

A No. 4 K Hand Coater was used to spread the heat-sealing solution. Dry layer thicknesses obtained here were from 7 μm to 9 μm.

Laboratory Drying of Coated Foils

The primed foils were dried for 15 seconds at 180° C. in an oven with air circulation, after a short period of drying in air (from 5 to 10 minutes).

Heat Sealing and Determination of Seal Seam Strength

Heat sealing equipment (HSG/ET) from Brugger was used to make the seals.

Sealing Conditions:

| | |
|---|---|
| Temperature: | 200° C. |
| Pressure: | 6 bar |
| Time: | 1 sec. |
| Sealing area: | 10 × 10 mm |

To determine seal seam strength, specimens were cut to give strips of width 15 mm and subjected to tension at a velocity of 100 mm/min using an Instron 1195 or Zwick 1454 tensile tester. During the peel test, care was taken that the foil parts previously separated from one another form an angle of 90° with the remainder which is as yet not subject to stress.

BHS VL-1600 laboratory pot-sealing equipment was used for sealing of the PP pots.

Component A:

The characteristics of the copolyesters (type 1) used here as examples of component A are listed in Table 1. These are semiaromatic copolyesters having various itaconic acid contents, based on the total amount of polycarboxylic acids. The type 0 also listed, with no itaconic acid, serves for efficiency comparison with respect to the examples below of heat-sealing applications.

TABLE 1

Characteristics of polyesters used

| Polyester | Itaconic acid content | $T_g$ | $M_w$ |
|---|---|---|---|
| Type 0 | — | 30° C. | 18 900 |
| Type 1 | 3.0 mol % | 33° C. | 15 800 |

Formulation for Heat-sealing Solution Composed of A, B and AB

Inventive Example 1

55 g of propyl acetate and 24 g of polyester of type 1 are used as initial charge in a jacketed vessel with attached thermostat, reflux condenser, blade stirrer and internal thermometer. The polyester is dissolved completely at 85° C., with stirring, and 0.5 g of tert-butyl 2-ethylperhexanoate is then admixed with the solution. In order to generate an ideal yield of free radicals along the polyester chains, this solution is stirred at 85° C. for a period of 30 min before a mixture composed of 16.0 g of methyl methacrylate and 16.0 g of butyl methacrylate is rapidly metered in by means of a metering pump.

After a total reaction time of 150 min, the polymer solution is cooled and diluted with 13.5 g of propyl acetate in order to reduce the viscosity of the solution.

Comparative Example 1

Conduct analogous to inventive Example 1b, using the polyester of type 0 instead of type 1.

Inventive Example 2

42 g of propyl acetate and 12.8 g of polyester of type 1 are used as initial charge in a jacketed vessel with attached thermostat, reflux condenser, blade stirrer and internal thermometer. The polyester is dissolved completely at 90° C., with stirring, and stirred for 30 min, and 0.15 g of tert-butyl 2-ethylperhexanoate is then admixed with the solution. In order to generate an ideal yield of free radicals along the polyester chains, this solution is stirred at 90° C. for a period of 30 min before a mixture composed of 12 g of methyl methacrylate and 12 g of butyl methacrylate and a further 0.15 g of tert-butyl 2-ethylperhexanoate is rapidly metered in by means of a metering pump.

The results of the graft experiments from the examples are collated in Table 2.

TABLE 2

Results of graft experiments

| | Itaconic acid content in polyester fraction | $M_w$ (RI) | $M_w$ (polyester) | HSS (N/15 mm) PET/PS |
|---|---|---|---|---|
| Inv. Ex. 1 | 0.4 mol % | 102 000 (bimodal) | 15 800 | 5.7 |
| Inv. Ex. 2 | 0.5 mol % | 38 100 (broad peak) | 15 800 | 4.1 |
| Comp. Ex. 1 | absent | 28 800 (bimodal) | 18 900 | 0.0 | n.d. = not determined
HSS = heat-seal strength

Comparison of the molecular weights shows in the case of the comparative example a bimodal product in which alongside the polyester starting material peak a second polymer fraction composed of polymethacrylates is present. In contrast to this, the products from inventive Example 2 and in particular from inventive Example 1 clearly comprise graft copolymers. The presence of these products acting as compatibilizers in a solution formulation with the otherwise incompatible homopolymers A and B leads to a heat-sealing coating which even without formulation additives has good heat-seal seam strengths for the system of PET with respect to PS.

Mixing Specification for Heat-sealing Solution Composed of A, B, C, AB and CB

Inventive Example 3

42.9 g of an EPDM and 20 g of an itaconic-acid-containing polyester of type 1 are dispersed in a mixture composed of 50 g of propyl acetate, 20 g of ethyl acetate and 10 g of isooctane in a stirred tank at 90° C. Firstly 2 g of tert-butyl perbenzoate are added and then a mixture composed of 18.5 g of n-butyl methacrylate and 18.5 g of methyl methacrylate are metered into this mixture over a period of 90 min. Polymerization is then carried out over a period of 120 min at 90° C. Finally, a further 0.5 g of tert-butyl perbenzoate is added for post-initiation and the mixture is stirred for a further 90 min at 90° C.

The content of polymer is about 45% by weight for inventive Example 3 and the content of solvent is about 55% by weight.

EPDM=ethylene-propylene-diene rubbers, Buna EP 6170
PMMA=polymethyl methacrylate
PBMA=polybutyl methacrylate
Polyester=modified polyester with 7 mol % of itaconic acid and $M_w$=14 400

Comparative Example 2

54.0 g of an EPDM are dispersed in a mixture composed of 50 g of propyl acetate, 20 g of ethyl acetate and 10 g of isooctane in a stirred tank at 90° C. Firstly 2 g of tert-butyl perbenzoate are added and then a mixture composed of 23.0 g of n-butyl methacrylate and 23.0 g of methyl methacrylate are metered into this mixture over a period of 90 min. Polymerization is then carried out over a period of 120 min at 90° C. Finally, a further 0.5 g of tert-butyl perbenzoate is added for post-initiation and the mixture is stirred for a further 90 min at 90° C.

The content of polymer is about 45% by weight for comparative Example 1 and the content of solvent is about 55% by weight.

EPDM=ethylene-propylene-diene rubbers, Buna EP 6170
PMMA=polymethyl methacrylate
PBMA=polybutyl methacrylate Results of Experiments
Heat-sealing Properties

TABLE 3

Heat-seal seam strengths of the system A, B, AB, C and CB

| | HSS (N/15 mm) | | | |
|---|---|---|---|---|
| Description | Al/PS | Al/PP | PET/PP | PET/PS |
| Inventive Example 3 | 8.5 | 7.1 | 5.6 | 5.2 |
| Comparative Example 2 | 11.8 | 10.1 | no PET adhesion | |

HSS: heat-seal strength

The invention claimed is:

1. A heat-sealable coating system, comprising:
a film-forming dispersion, comprising
a polymer A which is a polyester or a polyester mixture,
a polymer B which is a (meth)acrylate homo- and/or copolymer, comprising a methacrylate and/or an acrylate, and
a polymer AB which is a graft copolymer comprising a polymer A and a polymer B,
wherein
the amount of polymer A is from 5% by weight to 60% by weight,
the amount of polymer B is from 5% by weight to 70% by weight,
the amount of polymer AB is from 5% by weight to 60% by weight,
based on the total weight of the polymer A, B and AB, and
wherein the ratio by weight of the entirety of the polymer A, B and AB to the weight of a solvent or of a solvent mixture L is from 5:1 to 1:5.

2. The heat-sealable coating system according to claim 1, wherein polymer A is a polyester whose preparation involves copolymerization of itaconic acid.

3. The heat-sealable coating system according to claim 2, wherein polymer A is a polyester whose proportion of itaconic acid, based on the total amount of polycarboxylic acids used, is from 0.1 mol % to 20 mol %.

4. The heat-sealable coating system according to claim 3, wherein polymer A is a polyester whose proportion of itaconic acid, based on the total amount of polycarboxylic acids used, is from 2 mol % to 8 mol %.

5. The heat-sealable coating system according to claim 2, further comprising a polymer D which is a polyvinyl chloride and/or
a polymer $D_A$ which is a polyamide.

6. The heat-sealable coating system according to claim 5, wherein
the amount of polymer D is from 0.1% by weight to 10% by weight and
the amount of polymer $D_A$ is from 0.1% by weight to 10% by weight, based on the total weight of the polymer A, B, AB, D and $D_A$, and
wherein the ratio by weight of the entirety of the polymer A, B, AB, D and $D_A$ to the weight of the solvent or of the solvent mixture L is from 5:1 to 1:5.

7. The heat-sealable coating system according to claim 2, wherein simultaneous presence of a polymer A and of an initiator is involved in polymerization of a monomer which leads to polymer B.

8. The heat-sealable coating system according to claim 7, wherein reaction of the initiator with a double bond of an itaconic acid repeat unit in the polymer A forms a reactive centre for free-radical polymerization of a (meth)acrylate, and wherein said reactive center reacts further to give said graft copolymer AB.

9. The heat-sealable coating system according to claim 2, further comprising
a polymer C which is an olefin polymer or an olefin copolymer, and
a polymer CB which is a graft polymer comprising a polymer C and a polymer B.

10. The heat-sealable coating system according to claim 9, wherein the amount of polymer C is from 5% by weight to 60% by weight and the amount of polymer CB is from 5% by weight to 60% by weight, based on the total weight of the polymer A, B, AB, C and BC, and
wherein the ratio by weight of the entirety of the polymer A, B, AB, C and BC to the weight of the solvent or of the solvent mixture L is from 5:1 to 1:5.

11. The heat-sealable coating system according to claim 2, wherein the polymer AB is a graft copolymer having a polyester main chain and poly(meth)acrylate side chain.

12. The heat-sealable coating system according to claim 2, wherein polymer B is grafted simultaneously onto polymer A and a polymer C in order to prepare graft copolymers AB and CB.

13. The heat-sealable coating system according to claim 2, comprising
said polymer A,
said polymer B,
a polymer C which is an olefin polymer or an olefin copolymer,
said polymer AB,
a polymer CB which is a graft polymer comprising a polymer C and a polymer B, and
a polymer D and/or a polymer $D_A$, and
wherein
the amount of polymer A is from 5% by weight to 60% by weight,
the amount of polymer B is from 5% by weight to 70% by weight,
the amount of polymer C is from 5% by weight to 60% by weight,
the amount of polymer AB is from 5% by weight to 60% by weight,
the amount of polymer CB is from 5% by weight to 60% by weight,
the amount of polymer D is from 0% by weight to 10% by weight,
the amount of polymer $D_A$ is from 0% by weight to 10% by weight,
based on the total weight of the polymer A, B, AB, C, CB, D and $D_A$,
and that the ratio by weight of the entirety of the polymer A, B, AB, C, CB, D and $D_A$ to the weight of the solvent or of the solvent mixture L is from 5:1 to 1:5.

14. The heat-sealable coating system according to claim 1, further comprising
a polymer C which is an olefin polymer or an olefin copolymer, and
a polymer CB which is a graft polymer comprising a polymer C and a polymer B.

15. The heat-sealable coating system according to claim 14, wherein
the amount of polymer C is from 5% by weight to 60% by weight and
the amount of polymer CB is from 5% by weight to 60% by weight, based on the total weight of the polymer A, B, AB, C and BC, and
wherein the ratio by weight of the entirety of the polymer A, B, AB, C and BC to the weight of the solvent or of the solvent mixture L is from 5:1 to 1:5.

16. The heat-sealable coating system according to claim 1, comprising an auxiliary and/or an additive.

17. A process for the sealing of a heat-sealable substrate, comprising:
sealing said substrate with a coating system according to claim 1.

18. The process according to claim 17, comprising sealing polyester foil or PET-coated foil to polystyrene, polyester or polyvinyl chloride.

19. The process according to claim 17, comprising sealing polyester foil or aluminium foil or aluminium- or a PET-coated foil to polystyrene, polyester or polyvinyl chloride,
wherein in said coating system, polymer A is a polyester whose preparation involves copolymerization of itaconic acid, and
wherein said coating system further comprises
a polymer D which is a polyvinyl chloride and/or
a polymer $D_A$ which is a polyamide.

20. The process according to claim 17, comprising sealing polyester foil or aluminium foil or aluminium- or a PET-coated foil to polypropylene, polyethylene, polystyrene, polyester or polyvinyl chloride wherein said coating system comprises
said polymer A,
said polymer B,
a polymer C which is an olefin polymer or an olefin copolymer,
said polymer AB,
a polymer CB which is a graft polymer comprising polymer C and polymer B, and
a polymer D which is a polyvinyl chloride and/or
a polymer $D_A$ which is a polyamide, and
wherein
the amount of polymer A is from 5% by weight to 60% by weight,
the amount of polymer B is from 5% by weight to 70% by weight,
the amount of polymer C is from 5% by weight to 60% by weight,
the amount of polymer AB is from 5% by weight to 60% by weight,
the amount of polymer CB is from 5% by weight to 60% by weight,
the amount of polymer D is from 0% by weight to 10% by weight, and
the amount of polymer $D_A$ is from 0% by weight to 10% by weight,
based on the total weight of the polymer A, B, AB, C, CB, D and $D_A$,
and wherein the ratio by weight of the entirety of the polymer A, B, AB, C, CB, D and $D_A$ to the weight of the solvent or of the solvent mixture L is from 5:1 to 1:5.

21. A method for the heat sealing, comprising:
heat-sealing polyester foil or aluminium- or a PET-coated foil to polystyrene, polyester or polyvinyl chloride with the coating system according to claim 1.

22. A method for the heat sealing, comprising:
heat-sealing polyester foil or aluminium- or a PET-coated foil to polystyrene, polyester or polyvinyl chloride with the coating system according to claim 1, wherein
said polymer A is a polyester whose preparation involves copolymerization of itaconic acid, and
wherein said coating system further comprises
a polymer D which is a polyvinyl chloride and/or
a polymer $D_A$ which is a polyamide.

23. A method for the heat sealing, comprising:
heat-sealing polyester foil or aluminium- or a PET-coated foil to polypropylene, polyethylene, polystyrene, polyester or polyvinyl chloride with the coating system according to claim 1 which comprises
said polymer A,
said polymer B,
a polymer C which is an olefin polymer or an olefin copolymer,
said polymer AB,
a polymer CB which is a graft polymer comprising polymer C and polymer B, and
a polymer D which is a polyvinyl chloride and/or a polymer $D_A$ is present and is a polyamide, and
wherein
the amount of polymer A is from 5% by weight to 60% by weight,
the amount of polymer B is from 5% by weight to 70% by weight,
the amount of polymer C is from 5% by weight to 60% by weight,
the amount of polymer AB is from 5% by weight to 60% by weight,
the amount of polymer CB is from 5% by weight to 60% by weight,
the amount of polymer D is from 0% by weight to 10% by weight, and
the amount of polymer $D_A$ is from 0% by weight to 10% by weight,
based on the total weight of the polymer A, B, AB, C, CB, D and $D_A$,
and that the ratio by weight of the entirety of the polymer A, B, AB, C, CB, D and $D_A$ to the weight of the solvent or of the solvent mixture L is from 5:1 to 1:5.

* * * * *